United States Patent [19]

Davies

[11] 4,209,897
[45] Jul. 1, 1980

[54] FIXTURE FOR HOLDING ZIPPER SLIDERS

[75] Inventor: Evan E. Davies, Condell Park, Australia

[73] Assignee: Textron Inc., Providence, R.I.

[21] Appl. No.: 51,362

[22] Filed: Jun. 21, 1979

[51] Int. Cl.² .............................................. B23P 19/04
[52] U.S. Cl. ....................................... 29/768; 269/98; 269/321 W
[58] Field of Search .................. 29/767, 768, 408–410; 269/98, 97, 321 W

[56] References Cited

U.S. PATENT DOCUMENTS

| 2,569,424 | 9/1951 | Maylew et al. | 269/97 |
| 2,838,831 | 6/1958 | Aubuchon | 29/768 X |
| 3,789,487 | 2/1974 | Kawakami | 29/768 |
| 3,945,103 | 3/1976 | Fujisaki et al. | 29/768 |

Primary Examiner—Robert C. Watson
Attorney, Agent, or Firm—O'Brien and Marks

[57] ABSTRACT

A fixture for holding zipper sliders is disclosed as including a clamp attached to a generally inverted J-shaped standard having in the upper edge thereat a slot adapted to receive a zipper slider. A tip of the standard adjacent the slot is rabbetted on both sides transversely to the slot so that the tip has a width equal to that of the slot, and the top of the tip lies in the same plane as the bottom of the slot.

7 Claims, 4 Drawing Figures

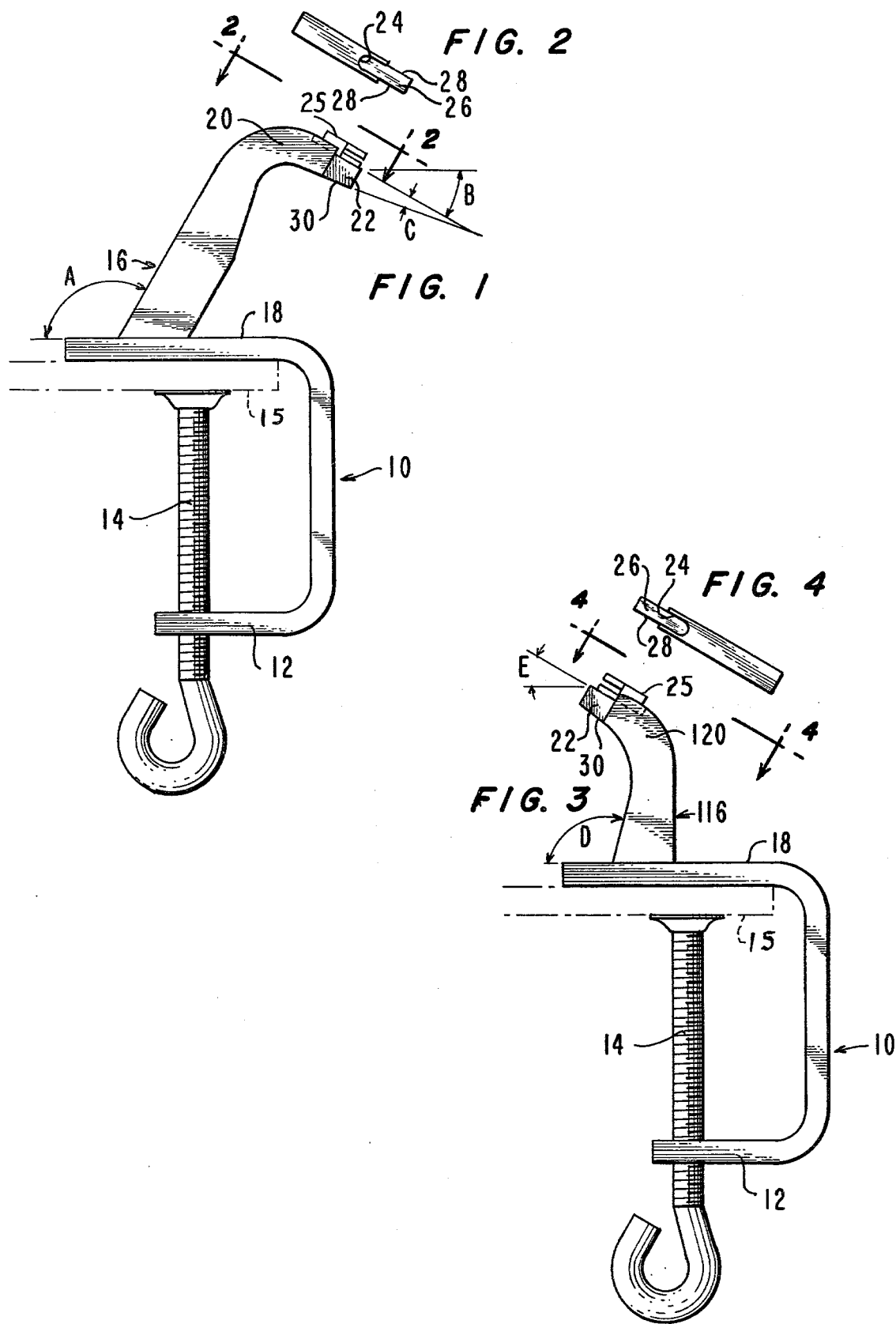

FIXTURE FOR HOLDING ZIPPER SLIDERS

BACKGROUND OF THE INVENTION

1. Field of the Invention

This invention relates to fixtures for holding sliders during the assembly of zippers for clothing or other articles.

Assembly of zippers includes introducing a pair of zipper stringers into a slider and then pulling the stringers through the slider. Since three elements must be manipulated at once, it can be appreciated that manual assembly requires considerable dexterity and that such assembly can be facilitated by providing the operator with a fixture to hold the slider during assembly.

2. Description of the Prior Art

Fixtures for holding sliders are known in the art, as exemplified by U.S. Pat. No. 2,838,831, which discloses a fixture that locks sliders in position during zipper assembly. As stated in the above-mentioned patent, many prior art slide holders are bulky and/or require manipulation during use. The device described in the above patent, for example, includes a handle which must be depressed to release the slider. Fixtures having moving parts are objectionable on the grounds of cost, maintenance, operator effort and safety; consequently a fixture having a simplified construction is desirable.

SUMMARY OF THE INVENTION

The present invention is summarized in that a fixture for holding sliders while assembling zippers includes a clamp, a standard to the upper surface of the clamp, a slot in the upper edge of the standard adapted to receive a slider, the slot having two sides and a plane bottom surface, and a tip terminating the upper end of the standard, the tip having an upper surface coplanar with the bottom surface of the slot, and having two transversely rabbetted sides coplanar with the respective sides of the slot.

An object of the present invention is to provide a fixture on which a slider can be readily placed which will hold the slider during zipper assembly.

A second object is to provide a texture having no moving parts, therefore requiring little or no resistance and providing improved safety to an operator.

Another object is to provide a fixture having no parts requiring manipulation by an operator during zipper assembly.

A further object is to provide a fixture of simple, compact construction in order to minimize interference with the work area and to facilitate storage, installation and removal.

Another object of the invention is to provide an inexpensively producible fixture for holding zipper slides.

These and other objects of the invention will be understood from the following description of two embodiments of the invention.

BRIEF DESCRIPTION OF THE DRAWING

FIG. 1 is a side elevation of a fixture embodying the present invention, showing a zipper slider positioned thereon.

FIG. 2 is an oblique view of the upper edge of the fixture shown in FIG. 1 taken along the line 2—2, with the slider omitted.

FIG. 3 is a side elevation of an embodiment of the fixture shown in FIG. 1, with a zipper slider positioned thereon.

FIG. 4 is an oblique view of the upper edge of the fixture shown in FIG. 3 taken along the line 4—4, with the slider omitted.

DESCRIPTION OF THE PREFERRED EMBODIMENTS

Referring to FIGS. 1 and 2, the present invention is embodied in a clamp, indicated generally at 10, including a U-shaped member 12 and an edge screw 14 threaded through the lower portion of member 12. The clamp is adapted to be placed over the edge 15 of a horizontal work surface with the open end of the clamp facing the work surface as shown.

A horn or standard indicated generally at 16 is secured, as by welding, to the upper surface 18 of the clamp. The standard extends obliquely upward from the clamp in a direction away from the open end of the clamp, making an angle of approximately 120° with surface 18.

The standard 16 has a generally inverted J-shape with an arcuate upper portion 20 oriented away from the open end of clamp 10. A slot 24 of appropriate size to hold a zipper slider 25 is formed along part of the upper edge of portion 20. The bottom of slot 24 is a plane surface 26 oriented downward at an angle B with respect to surface 18, angle B being approximately 120°. The upper portion 20 terminates at a tip 22 which has as its upper surface the slot bottom surface 26, and has two sides 28 rabbetted transversely to the slot so as to be coplanar with the sides of the slot. The lower edge 30 of the tip is tapered toward the slot bottom surface 26 at an angle C of approximately 10°. The edges and corners of the tip are polished to prevent tearing or snagging work material.

In operation, the fixture is clamped to a work surface 15 and a slider 25 is placed in the slot 24 where it is retained while an operator inserts stringers (not shown) into the slider. The stringers are then pulled through the slider in a direction up and away from the operator, and the assembly is lifted off the fixture.

An embodiment shown in FIGS. 3 and 4 has a clamp 10 as previously described with a standard 116 attached to the upper surface 18 thereof, the standard extending obliquely upward in a direction away from the open end of the clamp so as to make an angle of approximately 105° with the upper surface 18. The standard has an inverted J-shape with an arcuate upper portion 120 oriented upwardly in the direction of the open end of the clamp. The bottom surface 26 of slot 24 is included at an angle E with respect to surface 18, angle E being approximately 30°. The slot 24 and the tip 22 are configured as previously discribed.

The second embodiment is operated similarly to the first embodiment, except that work is pulled through the slider downwardly and toward the operator rather than upwardly and away. The operator can therefore use other embodiments according to preference.

It can be seen from the foregoing that the invention described facilitates manual zipper assembly while achieving the desirable results of simple manufacture and operation in a fixture that is easily installed, removed and stored. The absence of moving parts reduces the maintenance burden, does not require manipulation during use, and minimizes the possibility of injury to either the operator or the work.

Inasmuch as many variations in detail are possible within the scope of the present invention, it is intended that the above description and accompanying drawing be interpreted in an illustrative rather than a limiting sense.

What is claimed is:

1. A fixture for holding zipper sliders while assembling zipper stringers therethrough comprising:
   a clamp having an open end for attachment to a work surface;
   a standard attached to the upper surface of said clamp;
   a slot in the upper edge of said standard adapted to receive a zipper slider, said slot having two sides and a plane bottom surface; and
   a tip terminating the upper end of said standard, said tip having an upper surface coplanar with the bottom surface of said slot, and having two transversely rabbetted sides coplanar with the respective sides of said slot.

2. A fixture for holding zipper sliders as claimed in claim 1 wherein said slot is directed generally away from the open end of said clamp with the bottom surface of said slot being disposed at an angle of approximately 30° downward with respect to the upper surface of said clamp.

3. A fixture for holding zipper sliders as claimed in claim 2 wherein said standard meets the upper surface of said claim at an angle of approximately 120°.

4. A fixture for holding zipper sliders as claimed in claim 2 wherein said tip has a lower surface inclined toward the upper surface of said tip at an angle of approximately 10°.

5. A fixture for holding zipper sliders as claimed in claim 1 wherein said slot is directed generally toward the open end of said clamp with the bottom surface of said slot being disposed at an angle of approximately 30° upward with respect to the upper surface of said clamp.

6. A fixture for holding zipper sliders as claimed in claim 5 wherein said standard meets the upper surface of said clamp at an angle of approximately 105°.

7. A fixture for holding zipper sliders as claimed in claim 5 wherein said tip has a lower surface inclined toward the upper surface of said tip at an angle of approximately 10°.

* * * * *